United States Patent
Jepsen et al.

(10) Patent No.: US 12,347,899 B2
(45) Date of Patent: Jul. 1, 2025

(54) METAL HYDRIDE-HYDROGEN TANK SYSTEM WITH A FROST-START CAPABILITY

(71) Applicants: Helmholtz-Zentrum hereon GmbH, Geesthacht (DE); Volkswagen AG, Wolfsburg (DE); Panco GmbH, Mülheim-Kärlich (DE); Stühff GmbH, Geesthacht (DE)

(72) Inventors: Julian Jepsen, Hamburg (DE); José M. Bellosta Von Colbe, Wentorf (DE); Thomas Klassen, Wentorf (DE); Martin Dornheim, Reppenstedt (DE); Klaus Taube, Hamburg (DE); Julián Puszkiel, Barcelona (ES); Anna Kallias, Eschede (DE); Holger Stühff, Geesthacht (DE); Dieter Platzek, Mülheim-Kärlich (DE); Ignasi Cabezas Marce, Vilanova i la Geltru (ES)

(73) Assignees: Helmholtz-Zentrum Hereon GmbH, Geesthacht (DE); Volkswagen AG, Wolfsburg (DE); Panco GmbH, Mülheim-Kärlich (DE); Stühff GmbH, Geesthacht (DE)

( * ) Notice: Subject to any disclaimer, the term of this patent is extended or adjusted under 35 U.S.C. 154(b) by 528 days.

(21) Appl. No.: 17/787,458

(22) PCT Filed: Dec. 18, 2020

(86) PCT No.: PCT/EP2020/087051
§ 371 (c)(1),
(2) Date: Jun. 20, 2022

(87) PCT Pub. No.: WO2021/130116
PCT Pub. Date: Jul. 1, 2021

(65) Prior Publication Data
US 2023/0045434 A1 Feb. 9, 2023

(30) Foreign Application Priority Data
Dec. 23, 2019 (EP) .................... 19219243

(51) Int. Cl.
*H01M 8/04* (2016.01)
*H01M 8/04082* (2016.01)
*H01M 8/04089* (2016.01)
*H01M 8/04223* (2016.01)
*H01M 8/04225* (2016.01)

(52) U.S. Cl.
CPC ... *H01M 8/04225* (2016.02); *H01M 8/04089* (2013.01); *H01M 8/04216* (2013.01); *H01M 8/04253* (2013.01); *H01M 2250/20* (2013.01)

(58) Field of Classification Search
CPC ......... H01M 8/04225; H01M 8/04089; H01M 8/04216; H01M 8/04253; H01M 2250/20
USPC .......................................... 429/429
See application file for complete search history.

(56) References Cited

U.S. PATENT DOCUMENTS

| | | | |
|---|---|---|---|
| 4,667,815 A | 5/1987 | Halene | |
| 7,195,830 B2* | 3/2007 | Kobayashi | H01M 8/04007 429/513 |
| 11,616,245 B2 | 3/2023 | Bellosta Von Colbe et al. | |
| 2001/0026882 A1 | 10/2001 | Thierfelder et al. | |
| 2002/0100518 A1* | 8/2002 | Kuriiwa | F17C 11/005 141/4 |
| 2002/0136937 A1 | 9/2002 | Kelley et al. | |
| 2004/0200209 A1 | 10/2004 | Kirwan et al. | |
| 2005/0135961 A1 | 6/2005 | Young et al. | |
| 2009/0155648 A1 | 6/2009 | Lee et al. | |
| 2017/0214067 A1 | 7/2017 | Park et al. | |
| 2018/0233753 A1 | 8/2018 | Jang et al. | |
| 2021/0194026 A1 | 6/2021 | Bellosta Von Colbe et al. | |

FOREIGN PATENT DOCUMENTS

| | | |
|---|---|---|
| DE | 3502311 A1 | 7/1986 |
| DE | 19836352 A1 | 2/2000 |
| DE | 10317123 B4 | 9/2007 |

(Continued)

OTHER PUBLICATIONS

Burger et al., "Advanced reactor concept for complex hydrides: Hydrogen absorption from room temperature", International Journal of Hydrogen Energy, vol. 39, pp. 7030-7041, 2014.

(Continued)

*Primary Examiner* — James M Erwin
(74) *Attorney, Agent, or Firm* — Nields, Lemack & Frame, LLC

(57) ABSTRACT

A cold start device for an exothermic hydrogen consumer such as a fuel cell, as well as a method for operating an exothermic hydrogen consumer with a metal hydride storage system. An exothermic hydrogen consumer such as a fuel cell with an efficient cold start device which can be brought into operation rapidly and, does not require a pressure tank is provided. The cold start device is available for an unlimited number of start-up procedures. At least one starter tank is filled with a metal hydride which has an equilibrium pressure for desorption of at least 100 kPa at a temperature of −40° C., as well as at least one operating tank which is filled with at least one metal hydride, which has an equilibrium pressure of <100 kPa at temperatures of <0° C., and wherein the starter tank is incorporated into the operating tank.

17 Claims, No Drawings

(56) References Cited

FOREIGN PATENT DOCUMENTS

DE    102008002624 A1    6/2009
EP        1468722 A2    10/2004

OTHER PUBLICATIONS

Kolbig et al., "Characterization of metal hydrides for thermal applications in vehicles below 0 ° C.", International Journal of Hydrogen Energy, vol. 44, pp. 4878-4888, 2019.
Sakintuna et al., "Metal hydride materials for solid hydrogen storage: A review", International Journal of Hydrogen Energy, vol. 32, pp. 1121-1140, 2007.
European communication dated Jun. 30, 2020 in co-pending European patent application No. 19219241.7 (Europe).
Akanji et al., "Modeling of Hydrogen Adsorption/Desorption in a Metal Hydride Bed Reactor—A Theoretical Study," Advanced Materials for Renewable Hydrogen Production, Storage and Utilization. pp. 95-118, Nov. 2015.
Klebanoff et al., "Final Report for the DOE Metal Hydride Center of Excellence," Sandia National Laboratories, 163 pages, Feb. 2012.

\* cited by examiner

METAL HYDRIDE-HYDROGEN TANK SYSTEM WITH A FROST-START CAPABILITY

FIELD OF THE INVENTION

The invention relates to a metal hydride hydrogen tank system with a frost-start capability, for example a hydrogen tank system for an exothermic hydrogen consumer such as a fuel cell, as well as to a method for operating an exothermic hydrogen consumer of this type.

BACKGROUND OF THE INVENTION

In the electrolysis of water, water molecules are split into hydrogen ($H_2$) and oxygen ($O_2$) by electric current. In a fuel cell, this process runs in the reverse direction. By means of the electrochemical combination of hydrogen ($H_2$) and oxygen ($O_2$) to form water, the energy which is released is converted into electric current with a high degree of efficiency.

The technical implementation of the principle of the fuel cell has led to various solutions, in fact with various electrolytes and with operating temperatures of between 10° C. and 1000° C. Fuel cells are divided into low temperature, medium temperature and high temperature fuel cells as a function of their operating temperature (see, for example, DE 198 36 352 A1). Low temperature fuel cells operate at comparatively moderate operating temperatures of 60° C. to 120° C. and because of the moderate temperatures, they are in particular suitable for mobile applications such as for the operation of a motor vehicle. In motor vehicles, fuel cells of the low temperature PEM type are preferably used and are operated at temperatures between 60° C. and 90° C.

The hydrogen required as the fuel is usually supplied from a pressure tank, because it can be used to provide hydrogen over the entire operating temperature range. However, these pressure tanks are comparatively bulky, and so the range of mobile applications, such as in the case of operating a motor vehicle, is restricted because of the limited storage space which is available. It is known that hydrogen storage based on metal hydrides, so-called metal hydride storage systems, can be produced which require far less space for the same capacity. However, as a rule, heat has to be supplied to metal hydride storage in order to desorb hydrogen; to absorb hydrogen, heat has to be dissipated. Temperatures between −30° C. and 400° C. are required for hydrogen desorption, depending on the metal hydride. In general, however, hydrogen pressures of less than 10 MPa are required, which are sufficient for the operation of a fuel cell, and which substantially simplify the construction of these tanks compared with hydrogen pressure tanks.

Metal hydrides which are used for hydrogen storage are also divided into different categories as a function of desorption temperature. An overview of contemporary metal hydrides and their properties can be found in B. Sakintuna et al. "*Metal hydride materials for solid hydrogen storage: A review*", International Journal of Hydrogen Energy, Vol. 32 (2007), 1121-1140, and is incorporated herein by reference. Hydrogen is stored (absorbed) in the metallic lattice or released (desorbed) from the hydride in accordance with the equation:

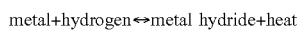

The relationship between pressure, temperature and concentration of hydrogen in the metal is plotted as the concentration-pressure isotherm (CPI). At a specific temperature, hydrogen is dissolved in the metallic lattice, raising the pressure thereby. This process obeys Sievert's law until a saturation concentration is reached (α phase). After this, the concentration increases in the metal without increasing the pressure—the hydride phase (β phase) is formed. This plateau region obeys both van't Hoff's law as well as the Gibb's phase rule. At the end of the plateau, the pressure increases again in a quadratic manner and hydrogen is dissolved in the hydride phase in accordance with Sievert's law. In order to compare different hydrides, it has become standard practice to construct van't Hoff diagrams from the equilibrium values in the middle of the plateau. The slope of the line gives the reaction enthalpy for the hydrogen absorption reaction ($\Delta H_{abs}$)—which is independent of temperature.

In the case of medium temperature hydrides, desorption starts between 100° C. and 200° C. at a normal pressure of 10 kPa. Medium temperature hydrides are defined by an absolute value for the reaction enthalpy ($|\Delta H_{abs}|$) for the hydrogen absorption reaction of between 30 kJ/mol $H_2$ and 65 kJ/mol $H_2$. As a rule, they have a storage density for hydrogen of approximately 2.5% by weight to 5% by weight based on the underlying metal. Medium temperature hydrides include, inter alia, alanates such as $NaAlH_4$ and amides such as $LiNH_2$ with an $H_2$ uptake capacity of up to 4.5% by weight. The optimum hydrogen uptake temperature for sodium alanate, for example, is approximately 125° C. and the hydrogen delivery temperature is 160° C. to 185° C. Because of the relatively high hydrogen storage capacity and relatively low operating temperatures, medium temperature hydrides are interesting candidates for mobile applications. Medium temperature hydrides with a hydrogen absorption temperature of 90° C. to 110° C. have been described in US 2005/0135961 A1.

In the case of high temperature hydrides, desorption starts at a normal pressure of 10 kPa at over 200° C. They are defined by an absolute value for the reaction enthalpy $|\Delta H_{abs}|$ for the hydrogen absorption reaction of more than 65 kJ/mol $H_2$. As a rule, they have an even higher storage density for hydrogen of approximately 7% by weight to 15% by weight based on the underlying metal. Because they are frequently produced from light metals (magnesium, aluminium) and/or non-metals (nitrogen, boron), they could possibly be suitable for use in fuel cells and $H_2$ internal combustion engines because of their high capacities, however the high temperatures are an obstacle to their being used as storage in fuel cells. High temperature hydrides are therefore currently not used in fuel cells and $H_2$ internal combustion engines.

Because of their relatively low storage capacity with respect to weight for hydrogen of less than 2% by weight, low temperature hydrides with a desorption temperature at a normal pressure of 10 kPa of between −40° C. and below 100° C. are only used for special cases of mobile applications, in particular for prototype fork-lift trucks and bicycles, for which a low storage capacity can be accommodated. They are defined by an absolute value for the reaction enthalpy $|\Delta H_{abs}|$ for the hydrogen absorption reaction of less than 30 kJ/mol $H_2$.

For the general use of metal hydride storage systems, then, an external heating system which heats the metal hydride storage system to discharge thereof is necessary. As a rule, the energy required to heat the metal hydride storage system has until now been supplied by the fuel cell or another heat source. Removal of the energy necessary for discharge of a metal hydride storage system is, however, not possible during start-up of the fuel cell and in the first minutes of its operation when it as yet cannot provide sufficient heat to warm up the metal hydride storage system. Furthermore, the fuel cells which are known in the art can only produce current for external use beyond a specific start-up temperature. In the case of a cold start or a rapid start, then, a fuel cell initially has to be heated to temperatures above the start temperature. Because of the large thermal mass of the fuel cells, a considerable amount of heating is required for this, in particular when the cold start has to be carried out in a similarly short period, as is the case with conventional combustion engines.

DE 10 2008 002 624 A1 discloses a hydrogen storage system for a fuel cell vehicle in which both a commercially available hydrogen storage alloy as well as a hydrogen storage material with a high hydrogen density and a low hydrogen delivery temperature are used in order to raise the volumetric storage density and the overall storage volume for hydrogen thereby. The hydrogen storage materials are present in an outer and an inner chamber which are separated by a metal filter. The reason for using the metal filter is to enable the hydrogen to pass through the outer and inner chambers and to prevent the metal powder from passing through. For this use of metal hydride storage systems too, an external heating system is used which heats the metal hydride storage system until it discharges.

DE 103 17 123 B4 discloses a fuel cell for mobile use, with a cold start device which comprises a hydrogen pressure tank as the hydrogen storage system as well as a metal hydride heating device. Hydrogen from the pressured gas tank is passed over the desorbed metal hydride storage system. This heats up, with the formation of the corresponding metal hydride, and in this manner the capacity of the fuel cell system is improved. However, in the case of the cold start device known from DE 103 17 123 B4, the number of cold start procedures and rapid start procedures is limited by the size of the pressure storage system because the pressure storage system is gradually discharged at each cold and rapid start-up and is not automatically recharged. In this respect, this system only provides an improved function for a pressure tank-based storage system which is capable of cold and rapid start-ups even without this device.

I. Bürger et al. "Advanced reactor concept for complex hydrides: Hydrogen absorption from room temperature" International Journal of Hydrogen Energy, Vol. 39 (2014), pages 7030-7041, discloses a combination of a complex hydride (CxH) and a room temperature hydride (MeH) in a tank and exploits the high charging capacity of the complex hydrides and the high reaction rate of room temperature hydrides in order to improve the cold start properties. In the case of a cold start, the room temperature hydride will be charged with hydrogen and heats up due to the exothermic reaction. This heats up the complex hydride as well and it then slowly returns to the operating temperature, delivers hydrogen and therefore supplies the fuel cell with hydrogen. Because of this reaction cascade of a room temperature hydride and a complex hydride and the slow heating of the complex hydride, the system is comparatively sluggish. Furthermore, the publication does not describe how the room temperature hydride is to be charged.

M. Kölbig et al. "Characterization of metal hydrides for thermal applications in vehicles below 0° C.", International Journal of Hydrogen Energy, Vol. 44 (2019), pages 4878-4888, considers charging and discharging a closed system produced from $LaNi_{4.85}Al_{0.15}$ as the heat-producing metal hydride and HYDRALLOY C5® ($Ti_{0.95}Zr_{0.05}Mn_{1.46}V_{0.45}Fe_{0.09}$) as the hydride-delivering metal hydride below 0° C.

All of the aforementioned systems are based on the fact that the fuel cell is supplied by means of a metal hydride which is heated by means of another source before going into operation. The fuel cell can only be operated after heating up the metal hydride. The objective of the present invention is to provide an efficient cold start device for an exothermic hydrogen consumer such as a fuel cell, which can be operated immediately and does not require a pressure tank or external hydrogen source, which are disadvantageous because of the limited space available, for example in passenger vehicles. Furthermore, the cold start device should be available for an unlimited number of start-up procedures.

SUMMARY OF THE INVENTION

In accordance with the invention, this objective is achieved by means of a method for operating an exothermic hydrogen consumer such as a fuel cell with the features defined in claim 1. Preferred embodiments of the invention are defined in the dependent claims.

In a first embodiment, the invention concerns a device for operating an exothermic hydrogen consumer such as a fuel cell, wherein the device comprises the exothermic hydrogen consumer, at least one starter tank and at least one operating tank, wherein the at least one starter tank consists of a container which is pressure-tight to hydrogen filled with a first metal hydride which is incorporated into the operating tank, wherein the first metal hydride has an equilibrium pressure for the desorption of hydrogen of at least 100 kPa at a temperature of −40° C., and wherein the at least one operating tank consists of a container which is pressure-tight to hydrogen filled with a second metal hydride, wherein the second metal hydride has an absolute value for the reaction enthalpy for the hydrogen absorption reaction ($|\Delta H_{abs}|$) of less than 65 kJ/mol $H_2$, preferably between 20 kJ/mol $H_2$ and less than 65 kJ/mol $H_2$, and has an equilibrium pressure for the desorption of hydrogen of less than 100 kPa at a temperature of −40° C. The known, generally low thermal conductivity of metal hydrides in this regard is exploited in the invention in order to minimize the transfer of heat between the pressure containers which contain the high or low temperature hydride, so that they can be kept at separate temperature levels. In addition, because the starter tank is incorporated into the operating tank, the space available in mobile applications is used to the best extent.

In order to simplify the approach, the reaction enthalpy for the hydrogen absorption reaction is relative to its absolute value ($|\Delta H_{abs}|$) of the reaction enthalpy. The reaction enthalpy for the hydrogen absorption reaction ($\Delta H_{abs}$) is usually negative, and so the absolute value is given without a sign. A quantity for the reaction enthalpy for the hydrogen absorption reaction ($|\Delta H_{abs}|$) of less than 65 kJ/mol $H_2$ therefore includes all reaction enthalpies which are represented by rational numbers between 0 and 65.

Preferably, the exothermic hydrogen consumer a fuel cell which comprises at least one cathode and at least one anode with an electrolyte disposed between them. Most preferably, the exothermic hydrogen consumer is a PEM fuel cell, for example a low temperature PEM fuel cell.

Preferably, the starter tank is spherical or cylindrical in configuration. In one embodiment of the invention, the metal hydride of the starter tank is a titanium-chromium-manganese-based alloy. Furthermore, the operating tank is preferably divided into two of more modules. One or more modules of the starter tank which are filled with the first metal hydride that has cold start properties are incorporated into one or more of these modules. Because at its preferred maximum operating pressure of less than 50 bar (5 MPa), the operating tank can have almost any shape which is required for the practically complete exploitation of the available space, it has almost no empty space, even if the space is rectangular, for example. The volumetric efficiency can therefore be maximized in this way.

A second embodiment of the invention pertains to a method for operating an exothermic hydrogen consumer such as a fuel cell, wherein the exothermic hydrogen consumer is initially supplied with hydrogen from at least one starter tank and which comprises a first metal hydride which has an equilibrium pressure for desorption of at least 100 kPa at a temperature of −40° C., and after reaching the operating temperature, the fuel cell is supplied with hydrogen from at least one operating tank which comprises at least one second metal hydride which has an absolute value for the reaction enthalpy ($|\Delta H_{abs}|$) for the hydrogen absorption reaction of less than 65 kJ/mol $H_2$ and has an equilibrium pressure for the desorption of hydrogen of less than 100 kPa at a temperature of −40° C., and the starter tank is cooled when the supply for the exothermic hydrogen consumer from the second operating tank commences, and the starter tank is recharged with hydrogen from the operating tank, wherein the starter tank is incorporated into the operating tank and is separated therefrom by a wall which is pressure-tight to hydrogen, so that the first metal hydride is insulated from environmental heat as soon as the starter tank is charged with hydrogen from the operating tank. As soon as the starter tank is fully recharged, cooling thereof can be stopped.

The wall between the starter tank and operating tank which is pressure-tight to hydrogen is provided so that under cold start-up conditions, the first metal hydride can build up a hydrogen pressure of at least 100 kPa which can be supplied to the exothermic hydrogen consumer for cold start-up without delivering the hydrogen pressure to the second metal hydride. Clearly, the outer wall of the operating tank is pressure-tight in order to prevent hydrogen from escaping into the environment. Typically, the container of the starter tank and/or the operating tank is produced from steel. Containers of this type which are pressure-tight to hydrogen and typically produced from steel which can be used as starter tanks and/or operating tanks have been described in DE 35 02 311 A1 which is incorporated herein by reference.

As mentioned, the exothermic hydrogen consumer, for example the fuel cell such as a PEM fuel cell, for example a low temperature PEM fuel cell is initially supplied with hydrogen from the starter tank, wherein the starter tank preferably comprises at least one metal hydride which has an equilibrium pressure for desorption of at least 300 kPa at a temperature of −40° C., more preferably at least 1000 kPa and in particular at least 1300 kPa, which in particular is advantageous for fuel cells which are operated in recirculation mode.

In the method in accordance with the invention, under cold start-up conditions, an exothermic hydrogen consumer such as a fuel cell is supplied with sufficient hydrogen from the starter tank so that the hydrogen consumer, for example the fuel cell, starts up and can heat up to the operating temperature. The exhaust heat from the exothermic hydrogen consumer can then heat up the operating tank, as the main hydrogen storage system, to its operating temperature as well, and can take over supply of the hydrogen consumer. When supplying the hydrogen consumer by means of the operating tank, the starter tank is then recharged with hydrogen from the operating tank. In this regard, it is necessary for the starter tank to be thermally decoupled from the operating tank. In this respect, the present invention exploits the fact that metal hydrides have a low thermal conductivity and can function as insulators.

In order to recharge the starter tank during the operation of the exothermic hydrogen consumer, in contrast to previously known solutions, the method described enables a substantially higher number of cold start-up procedures to be carried out which are not restricted by the volume of the starter tank, and is therefore an advantage of the invention—in addition to the simplified construction of the device for operating a fuel cell, for example. In addition, the solution in accordance with the invention provides a very inexpensive storage solution for the main hydrogen storage system without it having to have cold start properties of itself. Thus, for the operating tank, metal hydrides with a higher efficiency and/or those which are less expensive can be used. With the device in accordance with the invention and the method in accordance with the invention, the rapid supply of hydrogen for the operation of the fuel cell, for example—in particular at low temperatures and, for example, for automotive applications—is ensured, and this is also the case with a pressure tank—however with a higher volumetric density and the ability, because of the lower operating pressure, to select almost any shape for the operating tank.

In accordance with a further embodiment of the invention, the starter tank has a shell for the metal hydride contained therein which can withstand hydrogen pressures up to the maximum equilibrium pressure of the hydride at charging temperatures and operating temperatures of the operating tank. Super duplex steels are preferred for the shell of the starter tank. The lower the equilibrium pressure at the operating temperature of the operating tank—and consequently the maximum possible temperature in the system—the thinner and lighter can be the shell of the starter tank.

In accordance with a still further embodiment of the invention, the device for operating a fuel cell comprises a cooling system which cools down the starter tank when it is being charged as soon as the operating tank has taken over the supply to the hydrogen consumer. Peltier elements are advantageous here because they are extremely compact and enable direct cooling of the shell by heat conductivity or by coupling with a heat exchanger to cool the tank system via internal cooling channels. In reverse mode, they can also function as heating elements. As an alternative, conventional compressor-based cooling may be employed.

Preferably, the metal hydride of the starter tank is selected so that hydrogen is desorbed under frost-start conditions such as −40° C. or at similarly low temperatures. If a metal hydride with a higher desorption temperature is selected, then if necessary, for example at extremely low temperatures, heat transfer from the environment may be provided, for example by means of Peltier elements functioning as heating elements, by means of conventional separate heating systems or by means of the cooling medium for the exothermic hydrogen consumer so that hydrogen desorption is nevertheless enabled.

It is advantageous for the transfer of heat to be drawn out by a low supply pressure for the exothermic hydrogen consumer and a high charging pressure during operation, so that additional heat is not called for when the system can already deliver this heat.

When its normal operating temperature has been reached after the operation of the exothermic hydrogen consumer enabled by the starter tank (for low temperature PEM fuel cells, approximately 60° C. to 80° C.), the operating tank as well as any other consumers present in the vehicle, such as a vehicle interior heating, can be supplied with thermal energy from the exhaust heat from the fuel cell. A further portion of the power—for usual electrical power—from the exothermic hydrogen consumer (for example less than 5%) is used after reaching the operational status in order to cool the starter tank by means of its cooling system.

The construction of the operating tank is preferably such that it produces a higher hydrogen pressure at its own operating temperature, which is not necessarily the same as that of the exothermic hydrogen consumer, than the equilibrium pressure of the cold starter tank. In this manner, the starter tank can be recharged from the operating tank.

The heat generated upon recharging the starter tank is preferably dissipated in order to keep its equilibrium pressure below that of the operating tank and to enable recharging of the starter tank. As soon as the starter tank is fully charged, cooling can be switched off.

The invention claimed is:

1. A device for operating an exothermic hydrogen consumer, wherein the device comprises the exothermic hydrogen consumer, at least one starter tank and at least one operating tank, wherein the at least one starter tank comprises a container which is pressure-tight to hydrogen filled with a first metal hydride which is incorporated into the operating tank, wherein the first metal hydride has an equilibrium pressure for the desorption of hydrogen of at least 100 kPa at a temperature of −40° C., and wherein the at least one operating tank comprises a container which is pressure-tight to hydrogen filled with a second metal hydride, wherein the second metal hydride has an absolute value for the reaction enthalpy for the hydrogen absorption reaction ($|\Delta H_{abs}|$) of less than 65 kJ/mol $H_2$ and has an equilibrium pressure for the desorption of hydrogen of less than 100 kPa at a temperature of −40° C.

2. The device as claimed in claim 1, wherein the exothermic hydrogen consumer is a fuel cell.

3. The device as claimed in claim 1, wherein the starter tank is completely encased by the operating tank.

4. The device as claimed in claim 1, wherein the starter tank comprises a metal hydride which has an equilibrium pressure for desorption of hydrogen of at least 300 kPa at a temperature of −40° C.

5. The device as claimed in claim 4, wherein the starter tank comprises a metal hydride which has an equilibrium pressure for desorption of hydrogen of at least 1000 kPa at a temperature of −40° C.

6. The device as claimed in claim 5, wherein the starter tank comprises a metal hydride which has an equilibrium pressure for desorption of hydrogen of at least 1300 kPa at a temperature of −40° C.

7. The device as claimed in claim 1, wherein the metal hydride of the starter tank is a titanium-chromium-manganese-based alloy.

8. The device as claimed in claim 1, wherein the second metal hydride of the operating tank has an absolute value for the reaction enthalpy for the hydrogen absorption reaction ($|\Delta H_{abs}|$) of between 20 kJ/mol $H_2$ and less than 65 kJ/mol $H_2$.

9. The device as claimed in claim 1, wherein cooling of the starter tank is carried out by means of a Peltier element or by means of compressor-based cooling.

10. A method for operating an exothermic hydrogen consumer, wherein the exothermic hydrogen consumer is initially supplied with hydrogen from at least one starter tank and which comprises a first metal hydride which has an equilibrium pressure for desorption of hydrogen of at least 100 kPa at a temperature of −40° C., and after reaching the operating temperature, the fuel cell is supplied with hydrogen from at least one operating tank which comprises at least one second metal hydride which has an absolute value for the reaction enthalpy ($|\Delta H_{abs}|$) for the hydrogen absorption reaction of less than 65 kJ/mol $H_2$ and has an equilibrium pressure for the desorption of hydrogen of less than 100 kPa at a temperature of −40° C., and the starter tank is cooled when the supply for the exothermic hydrogen consumer from a second operating tank commences, and the starter tank is recharged with hydrogen from the at least one operating tank, wherein the starter tank is incorporated into the at least one operating tank and is separated therefrom by a wall which is pressure-tight to hydrogen, so that the first metal hydride is insulated from environmental heat as soon as the starter tank is charged with hydrogen from the at least one operating tank.

11. The method as claimed in claim 10, wherein the exothermic hydrogen consumer is a fuel cell.

12. The method as claimed in claim 10, wherein the starter tank comprises a metal hydride which has an equilibrium pressure for desorption of hydrogen of at least 300 kPa at a temperature of −40° C.

13. The method as claimed in claim 10, wherein the metal hydride of the starter tank is a titanium-chromium-manganese-based alloy.

14. The method as claimed in claim 10, wherein cooling of the first metal hydride storage system is carried out by a Peltier element or by compressor-based cooling.

15. The method as claimed in claim 10 wherein, when supplying the exothermic hydrogen consumer by means of the at least one operating tank, the exhaust heat from the exothermic hydrogen consumer is used to maintain the at least one operating tank at the desorption temperature.

16. The device as claimed in claim 1, wherein the exothermic hydrogen consumer is a PEM fuel cell.

17. The method as claimed in claim 10, wherein the exothermic hydrogen consumer is a PEM fuel cell.

* * * * *